May 12, 1931.    V. TANASSO ET AL    1,805,345
BOX STUD FOR NOSE BRIDGES
Filed Feb. 9, 1929
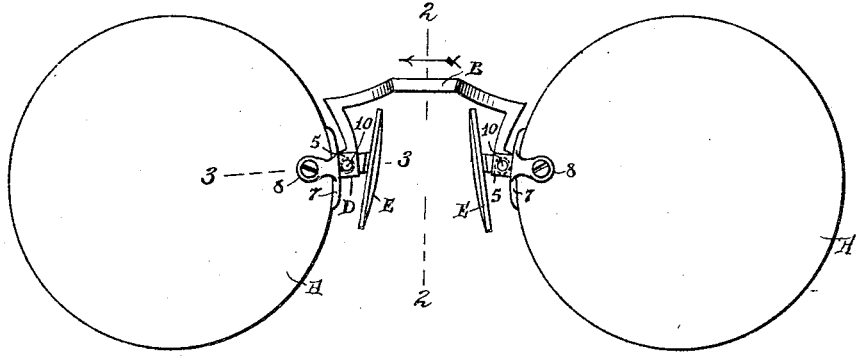
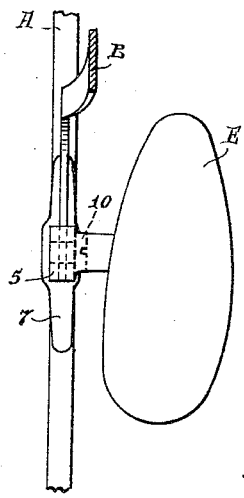
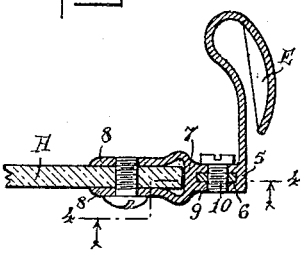
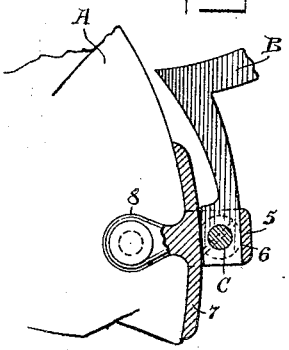
WITNESSES
William P. Goebel.
Hugh H. Ott
INVENTOR
Vincent Tanasso
Jacob J. Pomeranz
BY
ATTORNEYS Patented May 12, 1931

1,805,345

UNITED STATES PATENT OFFICE

VINCENT TANASSO, OF NEW YORK, AND JACOB J. POMERANZ, OF BROOKLYN, NEW YORK

BOX STUD FOR NOSE BRIDGES

Application filed February 9, 1929. Serial No. 338,734.

This invention relates to optical accessories and has particular reference to an improved means for connecting a spring nose bridge to a lens or lens rim so as to permit of the flexing of the nose bridge to spread the nose guards when applying the spectacles to or removing the same from the nose.

At the present time, the vogue in certain classes of spectacles or eyeglasses calls for an ornamental bridge which is in the nature of a thin flat strap-like element suitably shaped to produce the desired ornamental effect and arranged so as to dispose the major width of the material in a vertical plane. Under such construction and arrangement, the use of the common form of box studs is precluded and it is, therefore, the object of the present invention to provide an improved box stud in which the same is carried directly by a base and extending outwardly therefrom with the major width of the bridge in a plane coincident with the plane of the lenses, to receive a fastening element passing therethrough having its axis parallel with the axes of the lenses.

More specifically, the invention comprehends a box stud which is adapted for direct connection to a base and which is provided with a vertical bore having the major width disposed in a plane coincident with the lenses to receive the terminals of the nose bridge and to allow for connection therebetween by the employment of a screw or rivet passing through the nose bridge terminal and the box stud on an axis coincident with the axis of the lens.

The invention further aims to provide an improved means for connecting spring nose bridges of the character set forth to a lens or lens rim, which means is simple in construction and economical and efficient.

With the above recited and other objects in view, reference is had to the following description and accompanying drawings, in which there is exhibited one example or embodiment of the invention, while the claim defines the actual scope of the same.

In the drawings:

Figure 1 is a front view illustrating a nose bridge connected to eyeglass lenses by a box stud constructed in accordance with the present invention.

Figure 2 is a vertical enlarged fragmentary sectional view taken approximately on the line indicated at 2—2 in Figure 1.

Figure 3 is a horizontal sectional view taken approximately on the line indicated at 3—3 in Figure 1.

Figure 4 is a fragmentary sectional view taken approximately on the line 4—4 of Figure 3.

Referring to the drawings by characters of reference, A designates the eyeglass lenses, and B a spring nose bridge in the nature of a thin flat strip of resilient material which is suitably shaped to produce the desired ornamental effect and which is provided with apertured terminals C for connecting the same with the lenses through the medium of the improved box studs D which constitute the subject matter of the present invention.

The box studs B include a body 5 of rectangular tubular formation in horizontal cross section defining a vertically disposed rectangular bore 6 of a size to snugly receive the apertured terminals C of the nose bridge B. The body 5 extends outwardly from a suitable base 7 which may either be attached directly to the lenses A by the embracing lugs 8—8 or to a lens rim. The body 5 is provided with a transverse aperture 9 which intersects the bore 6 and which is disposed on an axis coincident with the axis of the lens A. The body 5 and the apertured terminals C are designed to receive therethrough a retaining element, such as a screw 10 or a rivet or other equivalent fastening means. If desired, the body 5 of the box stud may be formed with the usual nose guard E.

From the foregoing construction, it will thus be seen that a box stud has been devised for the purpose of connecting a spring nose guard to an eyeglass or spectacle lens or lens rim, in which the major width of the material from which the nose guard is constructed is disposed in a vertical plane coincident with the lenses A and received by the stud, the bore of which is disposed in the same plane so that twisting or bending of the nose bridge material is avoided. It is also apparent that due to this construction the nose bridge may be flexed to spread the guards E in applying the glasses to or removing the same from the nose.

What is claimed is:

In an eyeglass or spectacle construction, a nose bridge formed of a thin flat sheet of resilient material having a bight portion and depending leg portions disposed in the same plane with each other and in a vertical plane coinciding with the plane of the lenses and a box stud having its major width disposed in a plane coincident with the nose bridge and provided with a vertical bore receiving the lower terminals of the nose bridge leg portions and securing means passing through said box studs and said terminal portions and disposed on axes parallel to the axes of the lenses.

Signed at New York in the county of New York and State of New York, this 7th day of February A. D. 1929.

VINCENT TANASSO.
JACOB J. POMERANZ.